United States Patent
Kwan et al.

(10) Patent No.: US 7,948,880 B2
(45) Date of Patent: May 24, 2011

(54) ADAPTIVE DYNAMIC THRESHOLDING MECHANISM FOR LINK LEVEL FLOW CONTROL SCHEME

(75) Inventors: Bruce H. Kwan, Sunnyvale, CA (US); Puneet Agarwal, Cupertino, CA (US); Eugene N. Opsasnick, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 862 days.

(21) Appl. No.: 11/260,269

(22) Filed: Oct. 28, 2005

(65) Prior Publication Data

US 2006/0092837 A1 May 4, 2006

Related U.S. Application Data (60) Provisional application No. 60/696,505, filed on Jul. 6, 2005, provisional application No. 60/622,790, filed on Oct. 29, 2004.

(51) Int. Cl.
*H04J 3/14* (2006.01)
(52) U.S. Cl. ........................ 370/230; 370/232
(58) Field of Classification Search .................. 370/396, 370/389, 447, 94, 229, 471, 17, 230, 412, 370/413, 395, 232; 710/29; 375/376
See application file for complete search history.

(56) References Cited

U.S. PATENT DOCUMENTS

| | | | | |
|---|---|---|---|---|
| 5,179,556 A | * | 1/1993 | Turner | 370/233 |
| 5,541,912 A | * | 7/1996 | Choudhury et al. | 370/412 |
| 5,790,615 A | * | 8/1998 | Beale et al. | 375/376 |
| 6,067,298 A | * | 5/2000 | Shinohara | 370/395.71 |
| 6,185,186 B1 | * | 2/2001 | Watanabe | 370/232 |
| 6,430,153 B1 | * | 8/2002 | Hughes et al. | 370/230.1 |
| 6,456,590 B1 | * | 9/2002 | Ren et al. | 370/229 |
| 7,161,901 B2 | | 1/2007 | Vu | |
| 7,272,672 B1 | * | 9/2007 | Swenson et al. | 710/29 |
| 7,391,787 B1 | * | 6/2008 | McCrosky | 370/413 |
| 7,593,329 B2 | | 9/2009 | Kwan et al. | |
| 2002/0167950 A1 | * | 11/2002 | Chang et al. | 370/396 |
| 2003/0123393 A1 | | 7/2003 | Feuerstraeter et al. | |
| 2003/0202525 A1 | | 10/2003 | Nagatomo | |
| 2004/0004975 A1 | * | 1/2004 | Shin et al. | 370/471 |
| 2004/0042477 A1 | * | 3/2004 | Bitar et al. | 370/412 |
| 2004/0109412 A1 | * | 6/2004 | Hansson et al. | 370/229 |
| 2004/0114583 A1 | | 6/2004 | Cetin et al. | |
| 2004/0179476 A1 | * | 9/2004 | Kim et al. | 370/230 |
| 2006/0039400 A1 | * | 2/2006 | Mukhopadhyay et al. | 370/447 |

(Continued)

OTHER PUBLICATIONS

Hazarika, A. et al., "Why Priority/Class Based Pause is Required", P802.3ar Congestion Management, (Jul. 2005) pp. 1-10.

(Continued)

*Primary Examiner* — Kwang B Yao
*Assistant Examiner* — Syed Bokhari (57) ABSTRACT

A flow control sender includes an ingress port with one or more Class Groups (CG) defined including a shared buffer pool, a shared counter per ingress port per CG tracking an amount of the shared buffer pool utilized by each CG, an ingress port utilization counter per ingress port tracking an amount of the shared buffer pool utilized by the ingress port, and a controller computing a dynamic threshold for each CG, comparing the dynamic threshold of each CG with the ingress port utilization counter, and determining a particular CG experiencing congestion when the ingress port utilization counter is greater than the dynamic threshold for the particular CG. A flow control receiver ceases transmission of data packets to the particular CG experiencing congestion and allows transmission of the data packets corresponding to other CGs.

20 Claims, 8 Drawing Sheets

U.S. PATENT DOCUMENTS

2008/0212472 A1  9/2008  Musacchio et al.

OTHER PUBLICATIONS

Ayandeh, S. et al., "IEEE 802.3 Flow Control Baseline Requirements", IEEE 802.3 CMSG,(Jul. 12, 2004), pp. 1-11.

Finn, N "Vlans, Classes of Service , and Flows", IEEE 802.3 CMSG, (Jul. 2004),pp. 1-19.

Merchant, S. "Class based Flow Control A Necessary Requirement For Congestion Management", IEEE_Preso, (Jul. 19, 2005), pp. 1-10.

"Non-Final Office Action received for U.S. Appl. No. 11/260,232, mailed on Oct. 29, 2008", 27 Pages.

Abhijit K. Choudhury, et al., "Dynamic Queue Length Thresholds for Shared-Memory Packet Switches," Apr. 1998, IEEE/ACM Transactions on Networking, vol. 6, No. 2, pp. 130-140.

Ellen L. Hahne, et al., "Dynamic Queue Length Thresholds for Multiple Loss Priorities," Jun. 2002, IEEE/ACM Transactions on Networking, vol. 10, No. 3, pp. 368-380.

Notice of Allowance received for U.S. Appl. No. 11/260,232, mailed on May 18, 2009, 15 pages.

Notice of Allowance received for U.S. Appl. No. 11/260,232, mailed on Jun. 9, 2009, 8 pages.

* cited by examiner

ADAPTIVE DYNAMIC THRESHOLDING MECHANISM FOR LINK LEVEL FLOW CONTROL SCHEME

REFERENCE TO RELATED APPLICATIONS

This application claims priority of U.S. Provisional Patent Application Ser. No. 60/696,505, filed Jul. 6, 2005, and U.S. Provisional Patent Application Ser. No. 60/622,790, filed Oct. 29, 2004. The subject matter of this earlier filed application is hereby incorporated by reference.

BACKGROUND OF THE INVENTION

1. Field of the Invention

The invention is related to a system and method to enable sharing of buffering resources across traffic classes on devices that support link level flow control, more particularly, to a dynamic threshold mechanism to optimize throughput performance for shared memory switch devices to optimize throughput performance for shared memory switch devices that offer link level flow control support.

2. Description of the Related Art

With transmission of data over a digital communication network, such as an asynchronous transfer mode or ATM network, problems arise when multiple sources send data cells or packets at widely varying rates through a switch node or link of the network at an aggregated rate which taxes the ability of the switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for a long period of time, the buffer storage will be filled to maximum capacity and any additional data must be discarded.

In an effort to minimize such data loss, different types of flow control systems have been proposed. One such system for lossless data packet delivery for multiple classes of traffic between sources and receivers includes a link level flow control scheme (XON/XOFF) and is used in Ethernet line services. However, a granularity of this scheme is on a per port basis, which leads to a PAUSE of both high and low priority traffic. Specifically, IEEE 802.3 defines Link Level PAUSE (LLP) frames as a solution to guarantee lossless behavior over a point to point link. The main issue with the LLP is that once the LLP is triggered, all the traffic from a source or a sender is stopped. As a result, delay sensitive traffic is also stopped, thereby leading to unpredictable delays. Further, typically the LLP is initiated because of highly bursty Best Effort traffic due to the nature of LLP, thereby mostly affecting the high priority delay sensitive traffic. In addition, the LLP is typically triggered based on fixed thresholds of resource allocation, which can lead to under-utilization of resources across different traffic patterns.

Another solution for lossless behavior makes use of credit based flow control. This solution requires separate buffer pools on a per traffic class basis. However, sharing of buffering resources is not possible with this solution. Consequently, minimal resources cannot be leveraged across traffic classes, resulting in that limited resources may not be shared to meet the bursty demands of typical traffic.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to the present preferred embodiments of the present invention, examples of which are illustrated in the accompanying drawings, wherein like reference refers to the like elements throughout.

According to an embodiment of the present invention, an adaptive dynamic threshold mechanism for a link level flow control scheme for data traffic in a communications network are provided. The dynamic threshold mechanism is a buffer management scheme used to optimize throughput performance for shared memory for switch devices that support link level flow control. The dynamic threshold mechanism measures congestion and dynamically adjusts admission control rules of incoming data packets based on congestion information.

A Class Group is a grouping of COS queues. The goal of the Class Group concept is to enable coarse-grained link level flow control across more fine-grained queuing structures. This Class Group idea allows for support of the Service Aware Flow Control mechanism (described below) in devices with constrained buffering resources and limited capabilities to track per COS state. Although Class Group is used in the remainder of this document for clarity, wherever Class Group is used, it should be understood that Class of Service (COS) may also apply. Two frame delivery services are defined, Guaranteed Delivery (GD) and Best Throughput (BT). Guaranteed Delivery is defined as a frame delivery service that ensures lossless frame delivery between two link partners. Best Throughput is defined as a frame delivery service that does not guarantee lossless frame delivery. When subscribing to the BT service, frames may be dropped. Service Aware Flow Control may be used to enable Guaranteed Delivery (GD) service for specific classes of service. Service Aware Flow Control (SAFC) is a method that enables a reactive flow control scheme that provides lossless packet delivery for multiple classes of traffic across a common physical link between link partners to optimize throughput performance and enable differentiated packet delivery for switch devices that offer link level flow control support.

The dynamic threshold mechanism takes into account a service requirement of a delay sensitive and lossless nature of high priority data by keeping separate accounting at an ingress port per Class Group (CG) or per Class of Service (COS) and by providing that lossless delay sensitive high priority traffic may trigger flow control for example. Best effort traffic (i.e., low priority traffic) may be separately flow controlled at the discretion of user settings, thereby maintaining the high priority traffic on the link as long as possible. Any further best effort packets may be dropped at the ingress port in favor of the high priority traffic.

Conventional flow control systems do not allow reallocation of ingress buffer availability. Specifically, an ingress buffer may be partitioned and shared between various ingress ports. When a portion of the ingress buffer is experiencing congestion, rather than reallocating the data packets being transmitted to the portion of the ingress buffer experiencing congestion to other partitions of the ingress buffer that are not experiencing congestion or may be unused, further transmission of all of the data packets is paused, which may be detrimental to throughput of high priority data packets. Alternatively, data packets could also be dropped instead of paused. However, this would then compromise the lossless behavior that may be required for high priority frames. The dynamic threshold apparatus and method aims to optimize throughput while still retaining lossless behavior and impose fair access to buffer resources through the dynamic adjustments of the flow control thresholds (i.e., XOFF and XON thresholds).

To provide lossless performance, flow control is required. As a result of the low supply of available buffers at an ingress port, when congestion is determined at an ingress port, the ingress port will stop, pause, or drop the best effort traffic. If a buffer supply goes even lower, then and only then a PAUSE signal may be triggered for the high priority traffic. Thus, a proper tuning of the flow control threshold and providing a counter per CG at the ingress port, in accordance with an embodiment of the present invention, would effectively ensure that the high priority traffic can keep flowing on the link even under congestion scenarios. The dynamic threshold apparatus and method applies to both Ethernet networks as well as any other packet switching network. Also, the dynamic threshold apparatus and method may be also relevant for simple link level PAUSE as well where the system would then effectively be composed of only a single Class Group.

The dynamic threshold apparatus and method are triggered dynamically, that is, automatically or without user intervention. Within a switch, there is a common pool of buffers that can be accessible to all ingress ports. Based on ingress accounting and tracking of the amount of buffer space available in the shared pool, a turn-off signal (e.g., an XOFF message) may be set-up depending on the amount of buffer space available in the shared pool. Based on the amount of the shared pool available, the system will adaptively adjust when to send the turn-off signal.

In accordance with an embodiment of the present invention, the dynamic threshold apparatus and method are provided allowing the switch to pause one particular CG experiencing congestion over another by keeping separate accounting at the ingress port per CG. That is, instead of managing each data packet flow at the ingress ports the same, the dynamic threshold apparatus and method process each data packet per CG based on ingress port shared buffer utilization, that is, based on an available amount of shared buffer space as each data packet is received. The present invention may support any number of classes of service, for instance, data, voice, text, etc.

Figure 1:
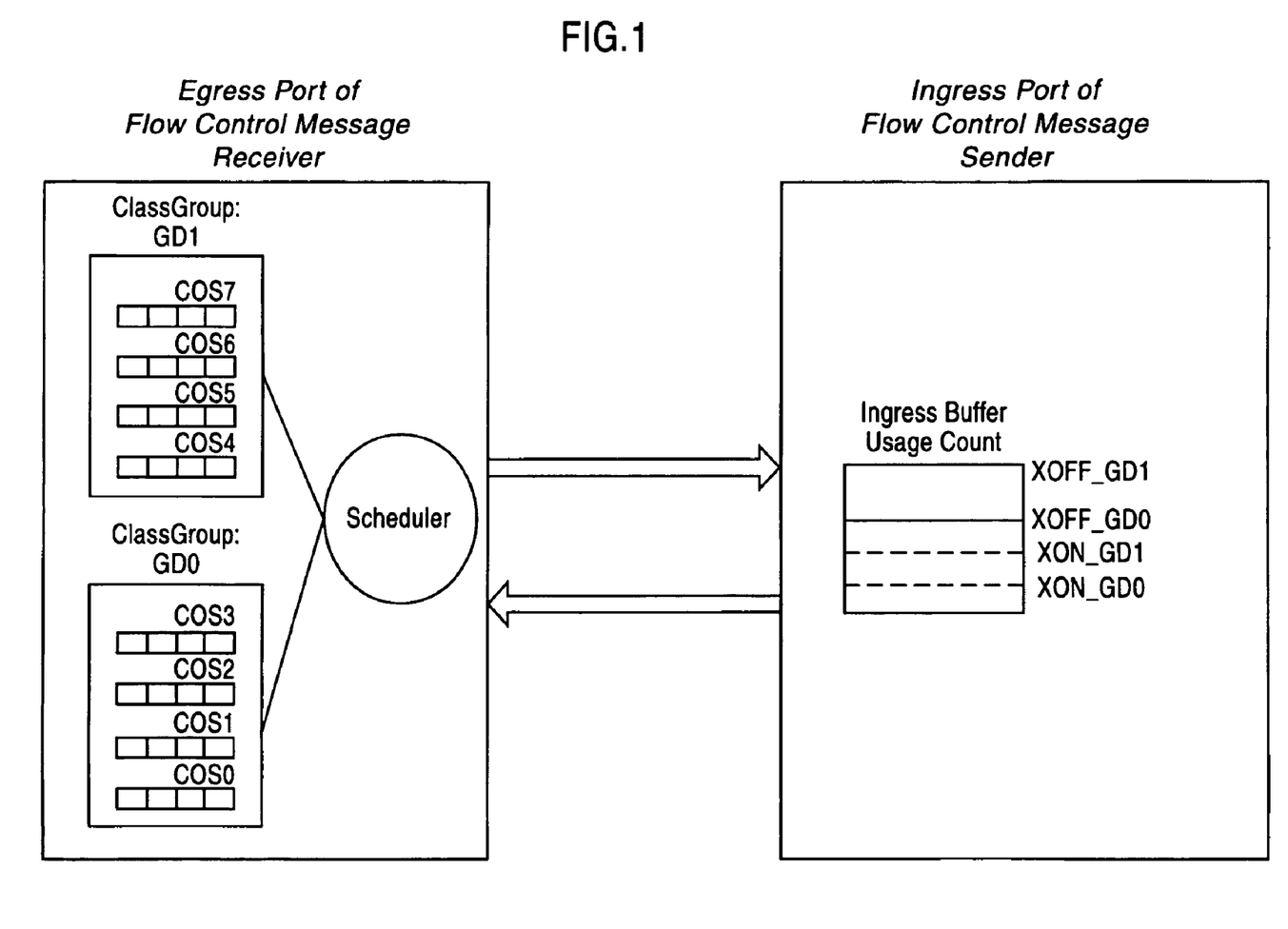
FIG. 1 illustrates an accounting at an ingress port at a Class Group granularity matching a granularity at which an egress port scheduler may flow control traffic, in accordance with an embodiment of the present invention.

FIG. 1 illustrates an accounting at an ingress port at a CG granularity matching a granularity at which an egress port scheduler may flow control traffic. The scheduler is responsible for scheduling access to the port bandwidth at the granularity of the COS queues while paying attention to a flow control state which affects the COS queues at the coarse-grained CG level. A specific Class of Service Identifier (COS ID #) is assigned to each data packet. The COS ID is used to aid in managing an accounting of buffer resources and to also identify the correct queue to utilize at a specific egress port. The following attributes may apply to the COS IDs: COS IDs are numbered COS0-COS7, and an implicit priority associated with the COS identifier is that COS7 is the highest priority and COS0 is a lowest priority. Associated with every COS ID is a frame delivery service, either Guaranteed Delivery (GD) or Best Throughput (BT).

For illustrative purposes, two Class Groups may be defined to each include 4 COS ID's. Each of the COS ID's are associated with a GD frame delivery service. Class Group GD1 contains COS ID's COS4-COS7 while Class Group GD0 contains COS ID's COS0-COS3. The Class Groups are used to collapse these COS ID's so that the flow control mechanism may operate across the 8 COS ID's using only 2 types of flow control events, one for Class Group GD0 and one for Class Groups GD1 In an alternative embodiment, the 2 types of flow control events may also be defined as one for Class Group GD0 and one for both GD1 and GD0.

At the egress port side of a flow control message receiver, a set of COS queues (one COS queue for every COS ID) is grouped according to Class Groups. At the ingress port side of a flow control message sender of FIG. 1, an ingress port counters are used to track ingress port buffer utilization for each CG. Flow control events are triggered according to an aggregate CG granularity and are used to stop and start traffic as classified for each CG.

Ingress buffers may be shared between ingress ports, regardless of Class Group as well. When the partition corresponding to a particular ingress port reaches a dynamic threshold or an XOFF threshold, then a signal would be transmitted to the link partner associated with that ingress port to flow control the data packets destined to that particular ingress port.

According to an embodiment of the present invention, the flow control is dynamic where, for instance, in cases when there is a small amount of congestion and a large pool of buffers is available, the dynamic threshold level of congestion is set at a high level, thereby leveraging buffer resources. The dynamic threshold level of congestion is set-up as a function of the available buffer resources across all buffer partitions. Accordingly, the dynamic threshold flow control mechanism of the present invention is a dynamic one as it continuously and automatically, without user intervention, monitors the available buffer resources and adjusts accordingly the dynamic threshold level of when to trigger flow control, thereby allowing one ingress port to utilize more of the shared buffering not currently being used by other ingress ports during times when congestion is not too severe across all of the ports. The dynamic threshold mechanism of the present invention allows ingress ports to make use of more of the shared buffering resources when device congestion is not too severe by enabling its flow control threshold to rise higher when needing to absorb a traffic burst.

According to an embodiment of the present invention, the dynamic threshold mechanism defines different buffer pools. The dynamic threshold scheme may allow that ingress buffer resources of the flow control sender 20 be partitioned into three types of buffer pools including headroom, reserve, and shared. The headroom buffer pool is used to absorb the "residual" packets that arrive following the sending of an XOFF message. In the event that the dynamic threshold mechanism has delays in responding to the XOFF message, the headroom buffer pools may be used to guarantee the no loss behavior required by a Guaranteed Delivery service, which requires lossless delivery of data frames. The headroom buffer pool exists per CG within the ingress port of the flow control sender 20.

A reserved space allows for a minimum guarantee on a per Class Group (CG) as well as per ingress port basis. The headroom buffer pool is a partition per ingress port resource that is further separated into distinct buffers, one for each CG and allows for accepting some data after the group's shared threshold is reached. There are two kinds of headroom. The first kind of headroom is a Class Group (CG) Headroom, which is a headroom designed to allow the round trip time of data to be received after a flow control message is sent out. For every lossless or GD CG, it must have a "full" headroom guarantee also to allow for lossless operation. The second kind of headroom is a global headroom, which is mainly designed for CGs that do not have their own Per-CG Headroom. This allocation of buffer memory is shared by all CGs of all input ports that are enabled to use it. It allows only one packet to complete if used for each CG within each port. This enables a large packet to complete so that during congestion events, large packets are not treated more poorly than short packets which would occur if the global headroom is not provided.

The reserve buffer pool is used to guarantee some level of throughput performance for the set of CGs and for specific CGs. A per port reserve buffer pool exists per ingress port within the flow control sender 20 of the ingress port. The per port reserve buffer pool is associated with the flow control sender 20 and is a single resource shared among the CGs. The per port reserved buffer pool is a partition per ingress port resource that is shared among the CGs. The purpose of the per port reserved buffer pool is to guard against starvation at the port granularity. The per CG reserve buffer pool exists per ingress port and per CG within the flow control sender 20 of the ingress port. The per CG reserver buffer pool is associated with the flow control sender 20 and is a resource associated with a particular CG of a particular ingress port. The purpose of the per CG reserved buffer pool is to guard against starvation within a port at the CG granularity. The shared buffer pool is shared among flow control senders of multiple ingress ports per CG. The shared buffer pool exists for each flow control sender 20 and it is considered a global buffer partition, which is shared among the ingress ports of the flow control sender. The shared space is the buffer space that is left over after all the headroom (per CG and global), per port reserve, and per CG reserve are subtracted from the total buffer. This shared space should be dynamically shared by the ports and priorities to make maximum use of this limited space. An option for static flow control thresholds is also possible.

When packets are arriving at the ingress port, the per CG reserve buffers are used first. If the per CG reserve buffers are depleted, then the per port reserve buffers are used. If the reserve buffer pools (per ingress port and per CG) are already consumed, in accordance with an embodiment of the present invention, then the shared buffer pool is used. If little of the common shared buffer pool is being used, then the dynamic XOFF threshold is set high, thereby delaying the flow control or sending a PAUSE signal to the flow control receiver. If a large amount of the common shared buffer reserved is already used, then the dynamic XOFF threshold is set low.

Figure 2:
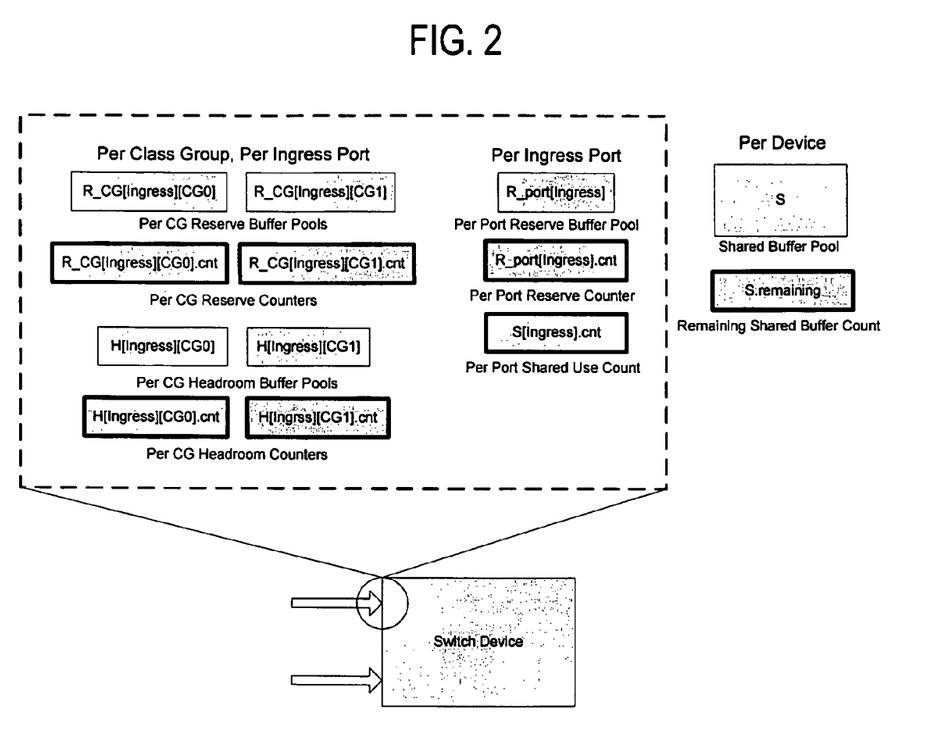
FIG. 2 illustrates an example of an ingress buffer organization for the ingress port and for the ingress buffer accounting (not including the global headroom)

FIG. 2 illustrates an example of an ingress buffer organization for the ingress port and for the ingress buffer accounting (not including the global headroom). Each port is allocated a portion of the data buffer space in each segment: headroom, shared, and reserved (per CG and per port). The per port and per-CG reserve buffer pools and headrooms buffer pools are programmed as static values. The per-port allocation of the shared space can be programmed as a static value or computed as a dynamic threshold. In one embodiment of this invention given the support of N total Class Groups, the per-port shared threshold is also used as CG-N's shared threshold (only the highest CG may use up all of the shared space). The shared space thresholds for the lower CG's are then computed as a fraction of the CG-N threshold. This is done so that higher priority traffic can always get through in times of congestion.

Each CG of each port may have the headroom allocated to it to absorb round-trip-time (RTT) packets in flight. This is mainly used for GD traffic types. In addition to the per-CG headroom, a single "shared global" headroom (not depicted in FIG. 2) is available to be shared by all the Best Throughput (BT) (non-lossless) class groups to try to minimize unfair packet loss due to large packet sizes (because large packets are more likely to cross the group threshold and be more likely to be dropped than small packets). Having some headroom available for packet completion mitigates this effect. The global headroom is only available to complete a single packet that has been partially received before running out of other buffer resources. Also, the global headroom is only used if it can accommodate the remaining portion of the partially-received packet. This is accomplished by assuming a "maximum-sized" packet is in progress, and the necessary space is "reserved" from the global headroom if it is available. If the necessary amount of buffering is available in the global headroom, then it will be used for any newly arriving portion of the packet, and any remaining portion reserved from the global headroom (if the packet is not an MTU packet), are immediately given back to the global headroom pool. The global headroom pool is only used if a packet has already been admitted into the buffer.

Instead of statically dividing up the buffer pool into the separate reserved buffer pools, the shared buffer pool is defined so as to better support bursty traffic patterns. It is believed that some traffic, such as high priority traffic, that requires Guaranteed Delivery service may have a bursty nature (i.e. disk traffic). The support from the shared buffer pool across the ingress ports would best meet the requirements of this type of traffic. The size of the shared buffer pool may be computed by subtracting a summation of all of the headroom and reserved buffer pools. One suggested method of computing the size of the shared buffer pool is as follows:

$$S = B\_\text{total} - \Sigma_{ingress, classgroups} H[\text{ingress}][\text{Class Group}] - R\_CG[\text{ingress}][\text{Class Group}] - \Sigma_{ingress} R\_\text{port}[\text{ingress}] \quad (1)$$

where H is the headroom buffer per ingress port per Class Group and R_CG is the reserve buffer per ingress port and per Class Group and R_port is the reserve buffer per port, shared among the Class Groups for the specific ingress port.

Access to the shared buffer pool by the ingress ports is managed through the use of the ingress port dynamic threshold apparatus, in accordance with an embodiment of the present invention, modified to operate within the context of flow control as to be described in FIGS. 3A-6B.

Figure 3A:
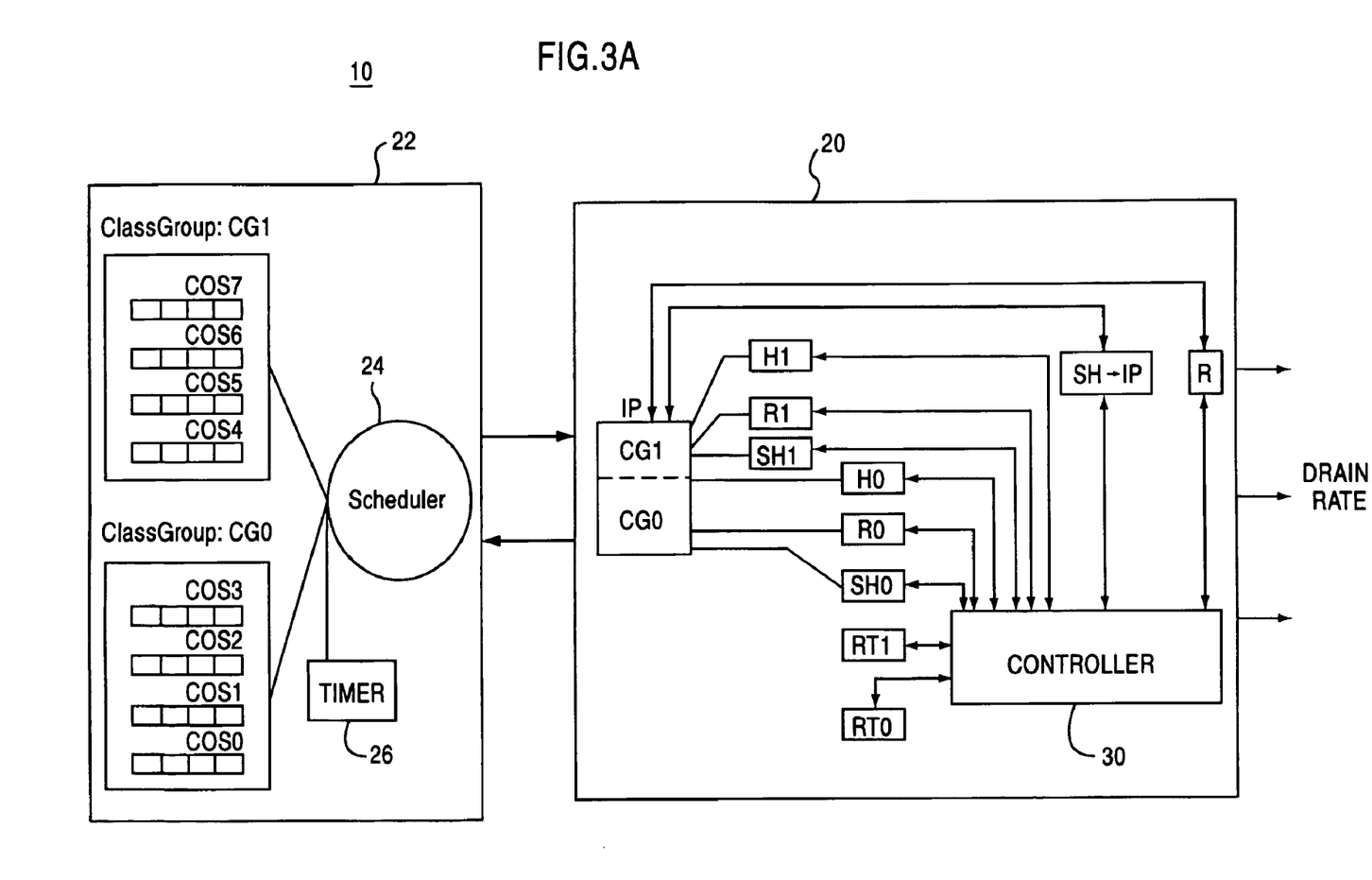
FIGS. 3A and 3B illustrate a dynamic triggered threshold apparatus, in accordance with an embodiment of the present invention.

FIG. 3A illustrates the dynamically triggered threshold apparatus 10 between at least one flow control sender 20 and at least one flow control receiver 22, in accordance with an embodiment of the present invention. A person of ordinary skill in the art will appreciate that the dynamic threshold system of the present invention may be applied to any flow control receiver/flow control sender configuration, not limited to a fabric or switch environment. The ingress port of the flow control sender 20 includes an ingress port receiving which then directs the data packets to the appropriate egress port where data packets are then exit the switch device at a specific drain rate. Associated with the ingress port are counters that are used to account for buffering resources. A controller 30 is provided to monitor the congestion at each ingress port and CG. Although FIG. 3A illustrates one ingress port, a person of ordinary skill in the art will appreciate that multiple ingress ports, each supporting multiple CGs may be implemented similarly to the ingress port illustrated in FIG. 3A.

In accordance with an aspect of the present invention, a group of headroom counters, H0 and H1, is provided to count or track headroom buffer utilization associated with each ingress port per CG. In this example, two CG's are accounted for but a person of ordinary skill in the art will appreciate that many more CG's may be tracked in a given implementation. Associated with each CG for each ingress port is a headroom threshold specifying a limit on an amount of headroom buffering that can be used for the specific ingress port and CG. A group of port reserved counters, R0 and R1, is provided to track the port reserved buffer pool utilization associated with each ingress port per CG. Another reserve buffer pool counter R is also provided to track the port reserved buffer pool utilization associated with the ingress port. A group of shared counters, SH0 and SH1, is provided per ingress port per CG to track the amount of buffering utilized by each CG per ingress port from the shared buffer pool. An ingress port utilization counter SH-IP is provided for each ingress port to track an amount of shared buffering utilized by each ingress port. Refresh timers, RT0 and RT1, are provided to correspond to each CG in the ingress port. Each refresh timer, RT0 and RT1, and each of the counters, R, H0, R0, SH0, H1, R1, and SH1, and the ingress port utilization counter SH-IP are operatively connected to the controller 30. Although multiple refresh timers are referred to above, a person of ordinary skill in the art will appreciate that a single refresh timers may be used to refresh the flow control status of all CG's.

In accordance with an embodiment of the present invention, the dynamic threshold mechanism allows the shared buffer pool to be dynamically shared across the ingress ports per CG. Specifically, each ingress port and CG is allowed a portion of the shared buffering. The portion may vary between ingress ports and CG depending upon the priority of the data packet and the number of shared buffers available for utilization.

Shared buffer utilization may be measured with respect to at least one XON threshold and at least one XOFF threshold or dynamic threshold from hereon. A drain rate of the packets from the device may vary over time. The dynamic threshold is a function of the available shared buffering remaining for the device. The shared counter SH0 measures the shared buffer utilization of the ingress port for CG0, the shared counter SH1 measures the shared buffer utilization of the ingress port for CG1, and the ingress port utilization counter SH-IP measures the shared buffer utilization of the entire ingress port.

Each dynamic threshold per ingress port per CG is defined by Equation (2) as a tunable alpha parameter (a) multiplied by $S_{remaining}$, which is a difference between a total size of the shared buffer pool (S) and a total usage of the shared buffer pool per ingress port (SH-IP) summed over all of the ingress ports, $$DT=\alpha *S_{remaining} \quad (2)$$

The alpha parameter ($\alpha$) is a parameter used to provide support for multiple priorities of data traffic and affects what portion each CG is allowed from the total size of the shared buffer pool of the ingress port. The alpha parameter ($\alpha$) is a parameter that roughly defines how much of the shared buffer pool is accessible to a particular CG of an ingress port and may be set during system set-up. When the alpha parameter ($\alpha$) is lower, the dynamic threshold (XOFF threshold) is lower. When the alpha parameter ($\alpha$) is higher, the dynamic threshold is higher.

As the shared buffer pool is used by the ingress port for at least one CG, the dynamic threshold is computed to track the shared buffer availability using Equation (2). The decision of whether or not a specific packet may make use of the shared buffer resources for a particular CG is based upon the ingress port utilization counter SH-IP being less than the dynamic threshold at the time the data packet arrives at the ingress port for the particular CG. The dynamic threshold for the particular CG is computed during input and output of a data packet from the shared buffer pool.

The dynamic threshold apparatus 10 works by having each ingress port track its shared buffer utilization on a per ingress port basis and comparing its usage against the per CG dynamic thresholds. Given a case where there are two Class Groups, CG0 and CG1, supported, for instance, there will be defined two possible dynamic thresholds that are compared against the ingress port utilization counter SH-IP. CG0 and CG1 in the ingress port have a shared counter, SH0 and SH1, associated thereto to keep track of the amount of buffering used from the shared buffer pool. The shared counters, SH-IP, SH0 and SH1, increment their count when a data packet arrives and decrement when the data packet is output. Each shared counter SH0 and SH1 counts the usage by the associated Class Group, CG0 and CG1, of the shared buffer pool of the ingress port. The controller 30 may determine $S_{remaining}$ as the difference between the total size of the shared buffer pool (S) and the total usage of the shared buffer pool for each ingress port (SH-IP) across all ingress ports. The controller 30 then proceeds to compute the dynamic threshold, $DT_{CG0}$, for CG0 as $\alpha_{CG0}*S_{remaining}$. The controller 30 also computes the dynamic threshold, $DT_{CG1}$, for CG1 as $\alpha_{CG1}*S_{remaining}$. In an alternate embodiment, a single dynamic threshold $DT_{CG1}$ may be computed for CG1 based on an a parameter. The dynamic threshold $DT_{CG0}$ may then be computed as a fraction of the dynamic threshold $DT_{CG1}$. For example, $DT_{CG0}$ may be computed as $f_{CG0}*DT_{CG1}$.

Figure 3B:
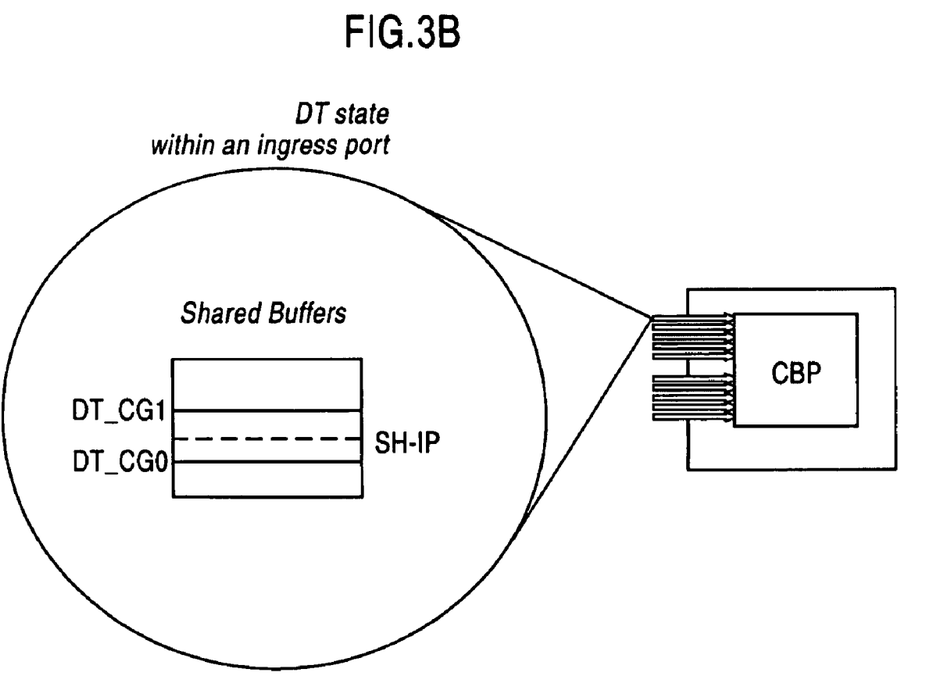

As illustrated in FIG. 3B, the dynamic thresholds, $DT_{CG0}$ and $DT_{CG1}$, are compared against the ingress port utilization counter SH-IP. When the ingress port utilization counter SH-IP is above the dynamic threshold, $DT_{CG0}$, for the Class Group CG0, but below the dynamic threshold, $DT_{CG1}$, associated with the Class Group CG1, the incoming data traffic corresponding CG1 traffic will still be able to make use of the shared buffers but incoming CG0 traffic will not be able to make use of the shared buffer pool. In an alternate embodiment, the dynamic thresholds may be compared against the ingress port and per CG utilization counters SH0 and SH1. In an example embodiment, the SAFC message may include a variable number of field pairs. This format is aimed at enabling the support of multiple refresh timers and multiple pause timers. The first field of the message would be a length field that identifies the number of field pairs that follow. Each field pair contains a COS number and a timer value. The timer value would be the indicator of whether the action for the associated COS should be an XON or and XOFF. When the timer value is set to '0', the action associated with the COS would be an XON. When the timer value is set to a non-zero value, the action associated with the COS would be an XOFF for the time specified in the timer value field. This timer value may be stored in 16 bits in units of pause_quanta which is equal to 512 bit times of a particular implementation. To specify that a Class Group is to be flow controlled (i.e. XOFF), the SAFC may include multiple field pairs that define the COS associated with the Class Group to be flow controlled.

Thus, if the ingress port utilization counter SH-IP reaches the $DT_{CG0}$, the controller 30 would send an XOFF message to the flow control receiver 22 identifying an XOFF state as a current state of the ingress port for CG0. Also, the controller 30 would send an XON message to the flow control receiver 22 identifying an XON state as a current state of the ingress port for CG1.

When dealing with different priorities of data, the dynamic threshold apparatus 10 allows a lowest CG0 to consume up to a dynamic threshold ($DT_{CG0}$) before flow control is triggered for that CG0. The higher CG is allowed to consume up to a second dynamic threshold ($DT_{CG1}$) before flow control is triggered for that CG and, if desired, all the CGs below.

In the alternative, as further illustrated in FIG. 3B, when the ingress port utilization counter SH-IP is below the dynamic threshold, $DT_{CG0}$, for the Class Group CG0, and below the dynamic threshold, $DT_{CG1}$, associated with the Class Group CG1, the incoming data traffic corresponding CG1 traffic will still be able to make use of the shared buffers and incoming CG0 traffic will also be able to make use of the shared buffer pool.

One of the attributes of this dynamic threshold mechanism is that it prevents the shared buffer pool from completely running out of buffer space. As the amount of remaining shared buffers gets very small, so do the dynamic thresholds which cause the flow control events to occur. Given that the headroom buffers are sized properly during set-up and that a user sets enough buffering aside, the remaining shared buffers should never actually go completely down to 0. However, the amount of remaining shared buffers for a particular CG can go down to a very small amount. When this occurs, the dynamic threshold will also be dynamically changed to be very small, corresponding to the amount of remaining shared buffers.

An XON threshold is defined for the ingress port per CG and is driven by the goal of avoiding underutilization of the egress port bandwidth (i.e. drain rate) in the dynamic threshold system. Consequently, the XON threshold may be a function of the used shared buffer pool for each ingress port and CG. The XON may be defined as a percentage of the previously computed dynamic threshold (i.e., XOFF threshold) or a static value depending on a particular system set-up. The flow control sender 20 may define the XON threshold in such a way that a time required to deplete its buffer space is larger than the time required to send an XON message to the flow control receiver 22, and for the flow control receiver 22 to successfully restart the data transmission packet flow towards the flow control sender 20. Thus, egress port resources at the flow control receiver 22 are not underutilized.

Thus, in accordance with an embodiment of the present invention, the dynamic threshold mechanism may identify congestion for a particular ingress port and CG corresponding to the XOFF state, thereby sending the XOFF message to the flow control receiver 22 pertaining only to the data packets for the ingress port and the particular CG. The data transmission of the data packets associated with other CGs in the ingress port would not be necessarily affected. The flow control sender 20 may use an SAFC message format that specifies a number of field pairs that defines the set of COS ID's to flow control. The set of COS ID's would include the set of COS ID's that is associated with the Class Group that requires flow control. In an alternate implementation, the flow control sender 20 may use a bitmap to flow control a group of CG. Another implementation would be to only specify the highest CG being flow controlled and then the flow control receiver 22 would need to stop that CG and all those CG below it.

When an XOFF condition lasts for a duration longer than specified in the SAFC message, the flow control state may be "refreshed" by the flow control sender. Accordingly, associated with each CG in each ingress port, refresh timers, RT0 and RT1, in this instance, in the flow control sender 20 are provided to "refresh" the current state of its flow control when the ingress port for the corresponding CG, CG0 or CG1, is in the XOFF state. Each refresh timer, RT0 and RT1, would time a refresh time period defined as a time period in which the congestion at the ingress port for the particular CG, CG0 or CG1, is detected (i.e., XOFF state) to when the congestion is expected to be resolved.

In turn, the flow control receiver 22 includes the scheduler 24 and at least one Class Group as described in FIG. 1. Also, the flow control receiver 22 includes a pause timer 26 per CG (to be later described), in accordance with an embodiment of the present invention. When the flow control receiver 22 receives the XOFF message from the ingress port in the flow control sender for a particular CG, the XOFF message affects the flow control receiver egress port's scheduler 24 such that all COS queues within the specified CG are no longer scheduled for service until the XON message is received. It is assumed that the flow control receiver 22 will be able to act upon a set of field pairs specifying that a set of COS requires flow control.

Link errors may cause the XON message to become corrupted and lost. Without proper error management mechanisms, this may lead to deadlock conditions and very poor performance. The flow control receiver 22 includes N ports transmitting the data packets to the flow control sender 20, the scheduler 24, and a set of pause timers per CG. For purposes of clarity and brevity, one pause timer 26 is illustrated in FIG. 3A. When the XOFF message is sent to the flow control receiver 22, the controller 30 in the flow control sender 20 attaches to the XOFF message a timeout value defining a time period for the flow control receiver 22 to determine when the XOFF should expire. The time period may vary depending on whether the ingress port for a particular CG is experiencing congestion or whether the entire ingress port for all the CGs is experiencing congestion. The flow control receiver 22 supports the determination that the XOFF has expired by using the appropriate per CG pause timer 26 that is set to the timeout value of the incoming XOFF message. The pause timer 26 would time from the timeout value down to 0. Upon reaching 0, the pause timer 26 would direct the flow control receiver 22 to resume transmission the data packets to the flow control sender 20 for the correct CG, thereby assuming that the congestion at the particular ingress port in the flow control sender 20 for the particular CG has been resolved. Although multiple pause timers are referred to above, a person of ordinary skill in the art will appreciate that a single pause timer may be used to individually control resumption of transmission for all CG's in an XOFF flow control state.

If an XON message is lost, the pause timer 26 in the flow control receiver 22 may expire and assume an implicit XON message to resume scheduling of the CG queues associated with the previously flow controlled CG. Accordingly, transmission of the data packets from the flow control receiver 22 to the flow control sender 20 would occur either if the flow control sender 20 sends the XON message explicitly directing the flow control receiver 22 to resume the transmission or if the pause timer 26 expires. Accordingly, the refresh timers RT0 or RT1 of the flow control sender 20 "refreshes" the current state of its flow control only when one of the CG's is in an XOFF state. When none of the CG's is in an XOFF state, no "refreshes" of the current state of its flow control are sent. The refresh timers are used to determine when the flow control sender 20 must refresh the flow control state for a particular CG. The refresh timers are user configurable and, in accordance with an embodiment of the present invention, has a value set to be less than the timeout value of the pause timer 28. When a refresh timer (RT0 or RT1) expires, the flow control sender 20 refreshes the flow control state of the priorities to the link partner (i.e., the flow control receiver 22). Thus, the refresh timer would time a refresh time period defined as a time in which the congestion at the flow control sender for the particular CG of the ingress port experiencing congestion is expected to be resolved. The refresh timer is set when the flow control sender sends an XOFF message to the flow control receiver.

Thus, the dynamic threshold of the present invention takes into account a service requirement of a delay sensitive and lossless nature of high priority traffic by keeping separate accounting at the ingress port of the flow control sender 20 per ingress port per CG and by providing that only the lossless delay sensitive high priority traffic triggers flow control, and that best effort traffic (i.e., low priority traffic) can be dropped and optionally (separately) flow controlled at a discretion of user groupings.

Figure 4:
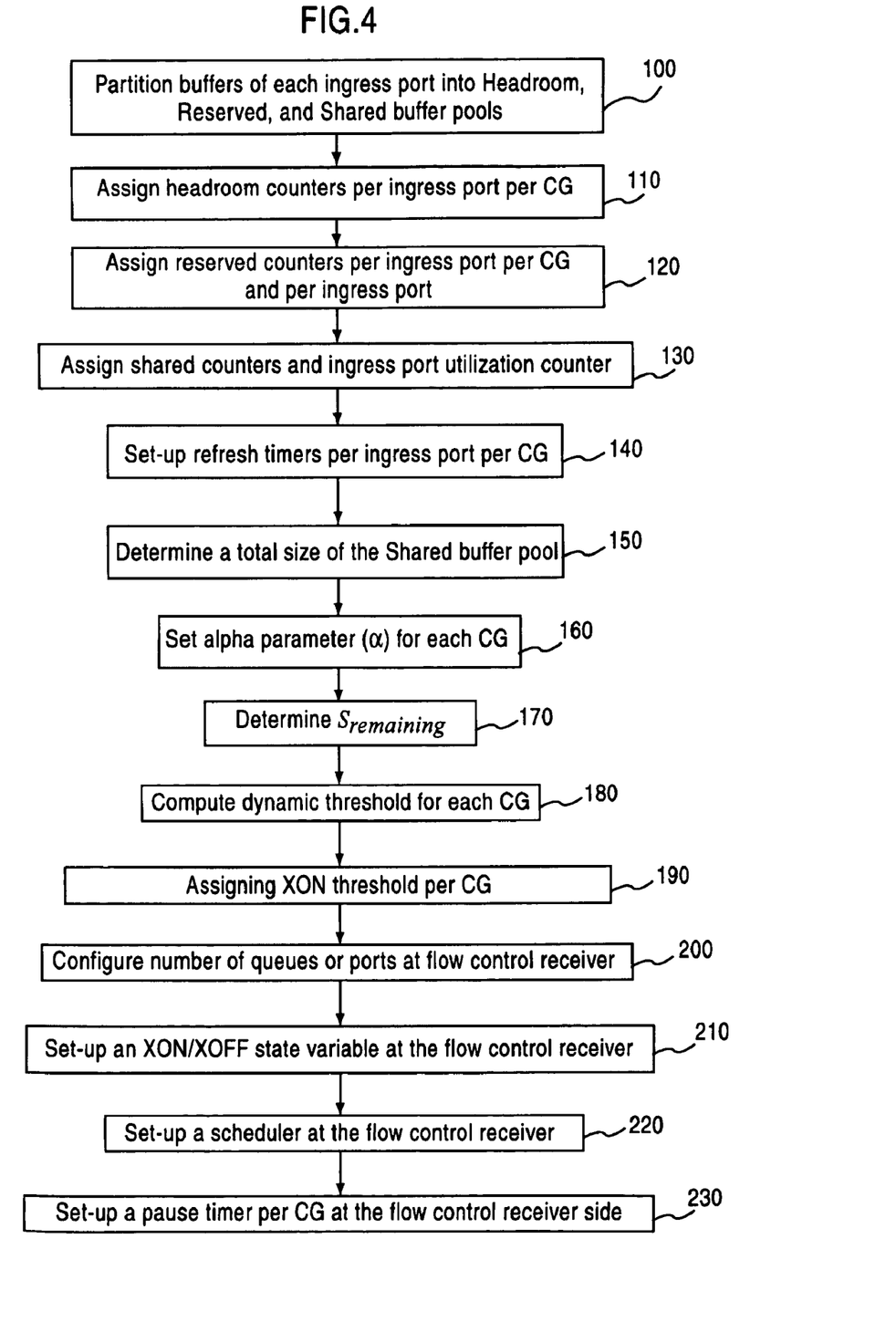
FIG. 4 illustrates a dynamic threshold determination method, in accordance with an embodiment of the present invention.

FIG. 4 illustrates a dynamic threshold determination method performed, in accordance with an embodiment of the present invention. At operation 100, at the flow control sender 20, the method partitions the buffers of each ingress port into the headroom, the reserved, and the shared buffer pools. The headroom buffer pool is provided per CG per ingress port. The per port reserved buffer pool is provided per ingress port shared among the CGs. The per CG reserved buffer pools are provided per ingress port and per CG. The shared buffer pool is provided per switching device, shared among all ingress ports. At operation 110, the method assigns the headroom counters, H0 and H1, per ingress port per CG to count or track the headroom buffer utilization associated with each ingress port per CG. As previously indicated, the headroom is a buffer used to absorb the "residual" packets that arrive following the sending of an XOFF message. Given the system has a delay in responding to an XOFF message, the headroom buffering partition is needed to guarantee no loss behavior. Associated with each ingress port and CG is a headroom threshold specifying the limit on the amount of headroom buffering that can be used for the specific ingress port and CG.

At operation 120, the method assigns the reserved counters, R per ingress port to track the port reserved utilization per ingress port and R0 and R1, per ingress port per CG to track the port reserved buffer utilization associated with each ingress port per CG. At operation 130, the method assigns the shared counters, SH0 and SH1, and the ingress port utilization counter SH-IP. The shared counter SH0 measures the shared buffer utilization of the ingress port for CG0, the shared counter SH1 measures the shared buffer utilization of the ingress port for CG1, and the ingress port utilization counter SH-IP measures the shared buffer utilization of the entire ingress port. At operation 140, the method sets-up the refresh timers, RT0 and RT1, per ingress port per CG.

At operation 150, the method determines the total size of the shared buffer pool (S). At operation 160, the method sets the alpha parameter (a) for each Class Group, CG0 and CG1, as a parameter based on the portion the particular CG is allowed from the total amount of shared buffer utilization allocated for the corresponding ingress port.

At 170, the method determines $S_{remaining}$ as the difference between the total size of the shared buffer pool (S) and the total usage of the shared buffer pool for all ingress ports (SH-IP summed over all ingress ports). At operation 180, the method proceeds to compute the dynamic threshold for each CG. Specifically, the method computes the dynamic threshold, $DT_{CG0}$, for CG0 as $\alpha_{CG0}*S_{remaining}$. The controller 30 also computes the dynamic threshold, $DT_{CG1}$, for CG1 as $\alpha_{CG1}*S_{remaining}$. Thus, the dynamic threshold (i.e., XOFF threshold) is computed as a function of the available shared buffering.

At operation 190, the method assigns the XON threshold per CG, CG0 and CG1. The XON may be defined as a percentage of the CG specific dynamic threshold (i.e., XOFF threshold) computed or a static value depending on a particular system set-up or when the XOFF threshold is used to trigger flow control. Operations 100 to 190 are performed at the flow control sender side 20.

At operation 200, the method configures the queues and ports at the flow control receiver 22. The queues need to be configured to operate at the Class Group granularity as defined between link partners. At operation 210, the method sets up an XON/XOFF state variable indicating the flow control receiver 22 whether the shared buffer of the ingress port per CG in the flow control sender 20 is in the XON state or XOFF state. At operation 220, the method sets-up the scheduler 24 so that transmission does not occur during the XOFF state. At operation 230, the method sets-up the pause timer 26 per CG at the flow control receiver side. Operations 200 to 230 are performed at the flow control receiver side.

Figure 5:
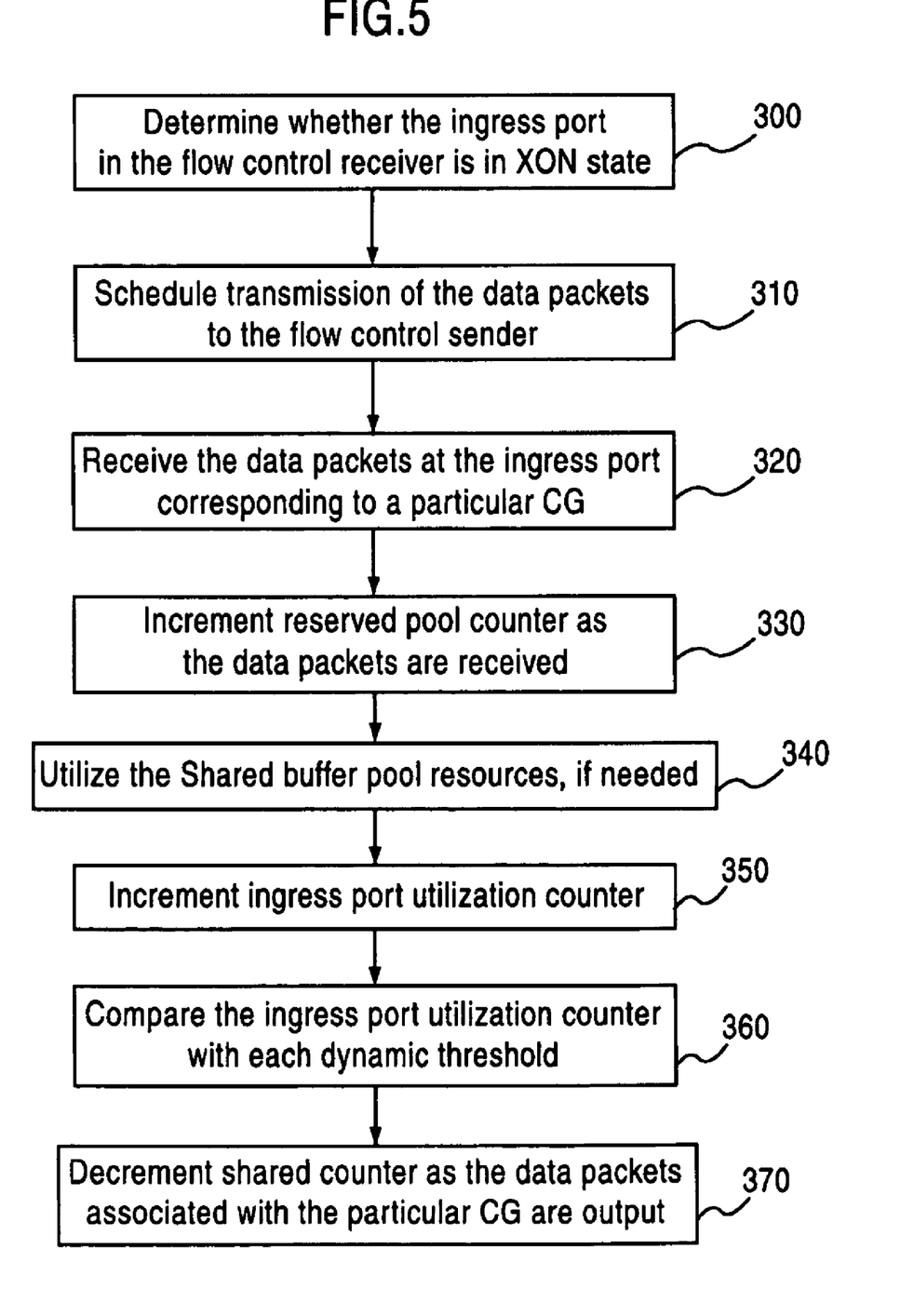
FIG. 5 illustrates a method performed during normal operation, in accordance with an embodiment of the present invention.

FIG. 5 illustrates a method performed during normal operation, with no congestion, between the flow control receiver 22 and the flow control sender 20, in accordance with an embodiment of the present invention. At operation 300, the method determines whether the ingress port in the flow control receiver 22 is in the XON state. Accordingly, at operation 310, the scheduler 24 in the flow control receiver 22 schedules transmission of the data packets to the flow control sender 20. At operation 320, in the flow control sender 20 side, the ingress port receives the data packets corresponding to a particular CG. There is an allowable amount of reserved buffer utilization for the ingress port per CG as well as per ingress port. At operation 330, the per CG or per ingress port reserved pool counter increments as the data packets are received. If there is space available in the per CG reserve pool, that space is used first. Otherwise, if there is space available in the per ingress port reserve pool, that space is used. When both of the reserved pools are depleted, the method proceeds to operation 340, where the method utilizes the shared buffer pool resources, if needed, pending the dynamic threshold determination.

As the data packets are received, at operation 350, the ingress port utilization counter SH-IP begins incrementing. At operation 360, the method compares the ingress port utilization counter SH-IP with each CG dynamic threshold calculated. For illustrative purposes, the method determines that the ingress port utilization counter SH-IP is below the dynamic threshold, $DT_{CG0}$, for the Class Group CG0, and below the dynamic threshold, $DT_{CG1}$, associated with the Class Group CG1. Thus, the incoming data traffic corresponding to CG1 traffic will still be able to make use of the shared buffers and incoming CG0 traffic will also be able to make use of the shared buffer pool. As the data packets associated with the particular CG, CG0 and CG1, are output from the flow control sender, at operation 370, the method decrements the corresponding shared counter, SH0 and SH1. Operations 350 and 370 may be performed in parallel or sequentially.

Figure 6A:
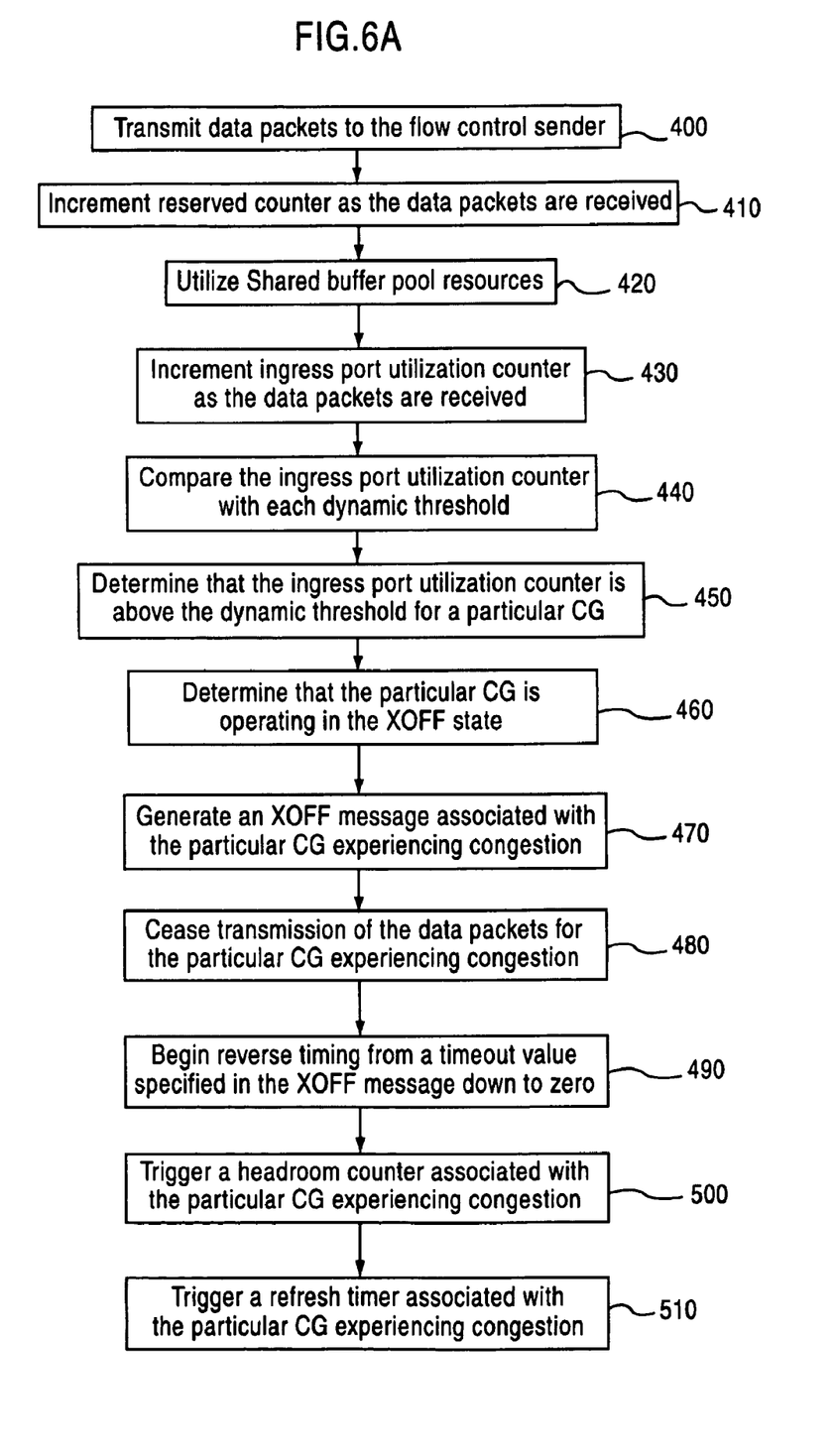
FIGS. 6A and 6B illustrate a method performed during congestion, in accordance with an embodiment of the present invention.
Figure 6B:
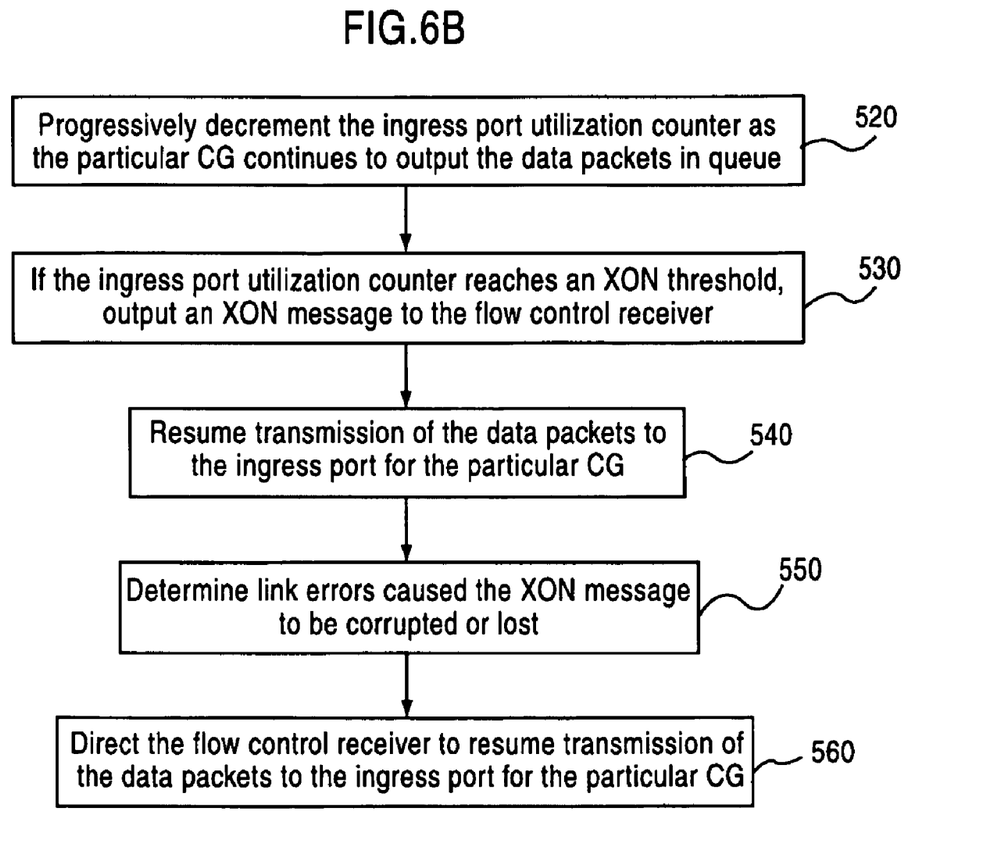

FIGS. 6A and 6B illustrate a method performed during congestion, between the flow control receiver 22 and the flow control sender 20, in accordance with an embodiment of the present invention. In FIG. 6A, at operation 400, the flow control receiver 22 transmits the data packets to the flow control sender 20. At operation 410, the appropriate reserved counter (either per CG or per ingress port) increments as the data packets are received. When the reserved buffer pools are depleted, the method proceeds to operation 420. At operation 420, the method begins to utilize the shared buffer pool resources.

As the data packets are received, at operation 430, the ingress port utilization counter SH-IP begins incrementing. At operation 440, the method compares the ingress port utilization counter SH-IP with each CG dynamic threshold calculated at operations 150 to 240 of FIG. 4. For illustrative purposes, the method compares the dynamic thresholds, $DT_{CG0}$ and $DT_{CG1}$, against the ingress port utilization counter SH-IP. At operation 450, the method determines that the ingress port utilization counter SH-IP is above the dynamic threshold, $DT_{CG0}$, for the Class Group CG0, but below the dynamic threshold, $DT_{CG1}$, associated with the Class Group CG1. The method determines that the incoming data traffic corresponding CG1 traffic will still be able to make use of the shared buffers but incoming CG0 traffic will not be able to make use of the shared buffer pool.

Accordingly, at operation 460, the method determines that the Class Group, CG0, has exceeded the allocated shared buffer space and, accordingly, that the particular CG0 of the ingress port is operating in the XOFF state. At operation 470, the method generates the XOFF message associated with the particular CG0 experiencing congestion and transmits the XOFF message to the flow control receiver 22.

In response, at operation 480, the flow control receiver 22 ceases transmission of the data packets for the particular CG experiencing congestion. For instance, the frames associated with CG0 will cease from being transmitted. At operation 490, the pause timer 26 of the flow control receiver 22 begins reverse timing from the timeout value specified in the XOFF message down to zero. Any additional CG0 data packets arriving to the particular buffer for the particular flow control receiver's ingress port is counted against the headroom buffer pool associated with CG0.

There may be a small delay to cease transmission of the data packets to the ingress port of the particular CG0 experiencing congestion from the time that the XOFF message is generated to the time the XOFF state is determined and the data packets for the particular CG0 experiencing congestion are ceased being scheduled at the flow control receiver. To compensate for this delay, when the XOFF message is sent to the flow control receiver 22, at operation 500, the method triggers the headroom counter H0 associated with the ingress port for the particular CG0 experiencing congestion to count the incoming CG0 data packets. The headroom counter H0 associated with the ingress port and the particular CG0 counts up from zero to the headroom threshold and tracks the amount of headroom buffering used. If the headroom counter H0 reaches the headroom threshold, new incoming CG0 packets would be dropped. To avoid dropping incoming data packets until the XOFF state is established, the headroom threshold need to be set high enough to account for a worst case scenario in order to completely avoid packet loss, thereby guaranteeing lossless delivery of packets.

At operation 510, the method triggers the refresh timer RT0 associated with the flow control receiver's ingress port of the particular CG0 experiencing congestion to begin reverse timing from the configurable refresh time value down to zero. In FIG. 6B, at operation 520, the flow control receiver will continue to send out frames that may be associated with buffer usage at the flow control receiver's ingress port. Consequently, the ingress port utilization counter SH-IP for the flow control receiver progressively decrements.

If the ingress port utilization counter SH-IP reaches the XON threshold, which is a percentage of the dynamic threshold, $DT_{CG0}$, at operation 530, the method outputs the XON message to the flow control receiver 22 indicative that the congestion detected at the ingress port for the particular CG0 has been resolved. At operation 540, the method directs the flow control receiver 22 to resume transmission of the data packets to the ingress port for the particular CG0.

If during the XOFF state, the XON message described in 530 is lost, at operation 550, the method determines that link errors may have caused the XON message to the flow control receiver 22 to become corrupted, or lost. This determination occurs based on the expiration of the per CG pause timer 26 located at the flow control receiver. Upon expiration of the CG0 pause timer at operation 560, the method directs the flow control receiver 22 to resume transmission of the data packets to the ingress port for the particular CG0. If during the XOFF state (before the expiration of the CG0 or CG1 pause timers), the refresh timer (RT1, RT0) at the flow control sender 20 for the particular CG experiencing congestion expires, the method determines that another XOFF message needs to be sent to the flow control receiver 22 to refresh the XOFF state at 22. In this case, the method would return to operation 470, where the flow control sender 20 would generate and transmit another XOFF message to the flow control receiver 22.

Although the refresh timers, RT0 and RT1, and the pause timer 26 are described as reverse timers, a person of ordinary skill in the art will appreciate that regular incremental timers may be used to perform similar timing functions.

Thus, the group thresholds of the port shared buffer space are set up to assert flow control on the lower priority traffic before the higher priority traffic as the shared buffer usage increases. This can lead to starvation of the lower priorities by higher priority traffic (at least within the shared space), but a per Class Group (CG) reserve buffer pool may provide starvation protection. Therefore, an XOFF flow control to any CG is not sent until both it's per CG reserve and per ingress port reserve has been used, and the shared space reaches the CG threshold.

In view of the foregoing, the present invention enables high priority traffic to continue to flow while providing a PAUSE for low priority traffic, while also enabling the sharing of buffering resources across traffic classes so that they may be better leveraged to meet the demands of bursty traffic.

In addition, while the terms packet and datagram have been used in the description of the present invention, the invention has import to many types of network data. For purposes of this invention, the term packet includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer implemented flow control method, comprising:
   receiving a data packet at a first ingress port of a network device;
   incrementing a first ingress port reserve counter;
   if the first ingress port reserve counter is less than a first ingress port reserve threshold, storing the received data packet in a reserved portion of a buffer, wherein the buffer is shared by a plurality of ingress ports of the network device; and
   if the first ingress port reserve counter is greater than the first ingress port reserve threshold:
      incrementing a first ingress port shared counter;
      determining a first ingress port shared threshold; and
      storing the received data packet in a shared portion of the buffer if the first ingress port shared counter is less than the first ingress port shared threshold.

2. The computer implemented flow control method of claim 1, wherein determining the first ingress port shared threshold comprises:
   determining an available amount of the shared portion of the buffer; and
   multiplying the available amount of the shared portion of the buffer by a percentage amount indicating the percentage of the shared portion of the buffer that can be used to store packets received at the first ingress port.

3. The computer implemented flow control method of claim 1, further comprising sending a pause message to a sender of data packets to the first ingress port if the first ingress port shared counter is greater than the first ingress port shared threshold.

4. The computer implemented flow control method of claim 3, wherein the pause message includes a time value indicating an expiration time of the pause message.

5. The computer implemented flow control method of claim 3, further comprising:
   receiving an additional data packet at the first ingress port of the network device;
   incrementing a first ingress port headroom counter;
   storing the additional data packet in a reserved headroom portion of the buffer if the first ingress port headroom counter is less than a first ingress port headroom threshold; and
   dropping the additional data packet if the first ingress port headroom counter is greater than the first ingress port headroom threshold.

6. The computer implemented flow control method of claim 3, further comprising:
   retrieving, from the shared portion of the buffer, a stored data packet that was received on the first ingress port of the network device;
   decrementing the first ingress port shared counter;
   determining whether the first ingress port shared counter is less than a first ingress port transmit on threshold; and
   sending a pause off message to a sender of data packets to the first ingress port.

7. The computer implemented flow control method of claim 6, further comprising determining the first ingress port transmit on threshold by multiplying the first ingress port shared threshold by a percentage.

8. A network device, comprising:
   a plurality of ingress ports;
   a processor; and
   a memory coupled to the processor and storing instructions that when executed by the processor cause the processor to:
      increment a first ingress port reserve counter when a data packet is received at a first ingress port of the network device;
      store the received data packet in a reserved portion of a buffer if the first ingress port reserve counter is less than a first ingress port reserve threshold, wherein the buffer is shared by the plurality of ingress ports; and
      if the first ingress port reserve counter is greater than the first ingress port reserve threshold:
         increment a first ingress port shared counter;
         determine a first ingress port shared threshold; and
         store the received data packet in a shared portion of the buffer that is shared by the plurality of ingress ports if the first ingress port shared counter is less than the first ingress port shared threshold.

9. The network device of claim 8, wherein the instruction stored in the memory to determine the first ingress port shared threshold further comprises instructions that when executed by the processor cause the processor to:
   determine an available amount of the shared portion of the buffer; and
   multiply the available amount of the shared portion of the buffer by a percentage amount indicating the percentage of the shared portion of the buffer that can be used to store packets received at the first ingress port.

10. The network device of claim 8, wherein the memory further stores instructions that when executed by the processor cause the processor to send a pause message to a sender of data packets to the first ingress port if the first ingress port shared counter is greater than the first ingress port shared threshold.

11. The network device of claim 10, wherein the pause message includes a time value indicating an expiration time of the pause message.

12. The network device of claim 10, wherein the memory further stores instructions that when executed by the processor cause the processor to:
   increment a first ingress port headroom counter upon receiving an additional data packet at the first ingress port of the network device;
   store the additional data packet in a reserved headroom portion of the buffer if the first ingress port headroom counter is less than a first ingress port headroom threshold; and
   drop the additional data packet if the first ingress port headroom counter is greater than the first ingress port headroom threshold.

13. The network device of claim 10, wherein the memory further stores instructions that when executed by the processor cause the processor to:
   retrieve, from the shared portion of the buffer, a stored data packet that was received on the first ingress port of the network device;
   decrement the first ingress port shared counter;
   determine whether the first ingress port shared counter is less than a first ingress port transmit on threshold; and
   send a pause off message to a sender of data packets to the first ingress port.

14. The network device of claim 13, wherein the memory further stores instructions that when executed by the processor cause the processor to determine the first ingress port transmit on threshold by multiplying the first ingress port shared threshold by a percentage.

15. A recordable non-transitory storage medium comprising instructions stored thereon that, when executed by a processor in a network device, cause the processor to: increment a first ingress port reserve counter when a data packet is received at a first ingress port of the network device; store the received data packet in a reserved portion of a buffer if the first ingress port reserve counter is less than a first ingress port reserve threshold, wherein the buffer is shared by the plurality of ingress ports; and if the first ingress port reserve counter is greater than the first ingress port reserve threshold: increment a first ingress port shared counter; determine a first ingress port shared threshold; and store the received data packet in a shared portion of the buffer that is shared by the plurality of ingress ports if the first ingress port shared counter is less than the first ingress port shared threshold.

16. The recordable non-transitory storage medium of claim 15, wherein the instruction to determine the first ingress port shared threshold further comprises instructions that when executed by the processor cause the processor to: determine an available amount of the shared portion of the buffer; and multiply the available amount of the shared portion of the buffer by a percentage amount indicating the percentage of the shared portion of the buffer that can be used to store packets received at the first ingress port.

17. The recordable non-transitory storage medium of claim 15, further comprising instructions stored thereon that when executed by the processor cause the processor to send a pause message to a sender of data packets to the first ingress port if the first ingress port shared counter is greater than the first ingress port shared threshold.

18. recordable non-transitory storage medium of claim 17, wherein the pause message includes a time value indicating an expiration time of the pause message.

19. The recordable non-transitory storage medium of claim 17, further comprising instructions stored thereon that when executed by the processor cause the processor to: increment a first ingress port headroom counter upon receiving an additional data packet at the first ingress port of the network device; store the additional data packet in a reserved headroom portion of the buffer if the first ingress port headroom counter is less than a first ingress port headroom threshold; and drop the additional data packet if the first ingress port headroom counter is greater than the first ingress port headroom threshold.

20. The recordable non-transitory storage medium of claim 17, further comprising stores instructions stored thereon that when executed by the processor cause the processor to: retrieve, from the shared portion of the buffer, a stored data packet that was received on the first ingress port of the network device; decrement the first ingress port shared counter; determine whether the first ingress port shared counter is less than a first ingress port transmit on threshold; and send a pause off message to a sender of data packets to the first ingress port.

* * * * *

UNITED STATES PATENT AND TRADEMARK OFFICE
CERTIFICATE OF CORRECTION

| | | |
|---|---|---|
| PATENT NO. | : 7,948,880 B2 | Page 1 of 1 |
| APPLICATION NO. | : 11/260269 | |
| DATED | : May 24, 2011 | |
| INVENTOR(S) | : Bruce H. Kwan et al. | |

It is certified that error appears in the above-identified patent and that said Letters Patent is hereby corrected as shown below:

In column 18, line 4, in claim 18, delete "recordable" and insert -- The recordable --, therefor.

Signed and Sealed this
Twenty-fifth Day of October, 2011

David J. Kappos
*Director of the United States Patent and Trademark Office*